June 5, 1962 A. CAPETTA 3,037,424
PROCESS FOR THE REALIZATION OF A RELIEF SCREEN
AND SCREEN OBTAINED BY THE PROCESS
Filed Jan. 10, 1958 4 Sheets-Sheet 2
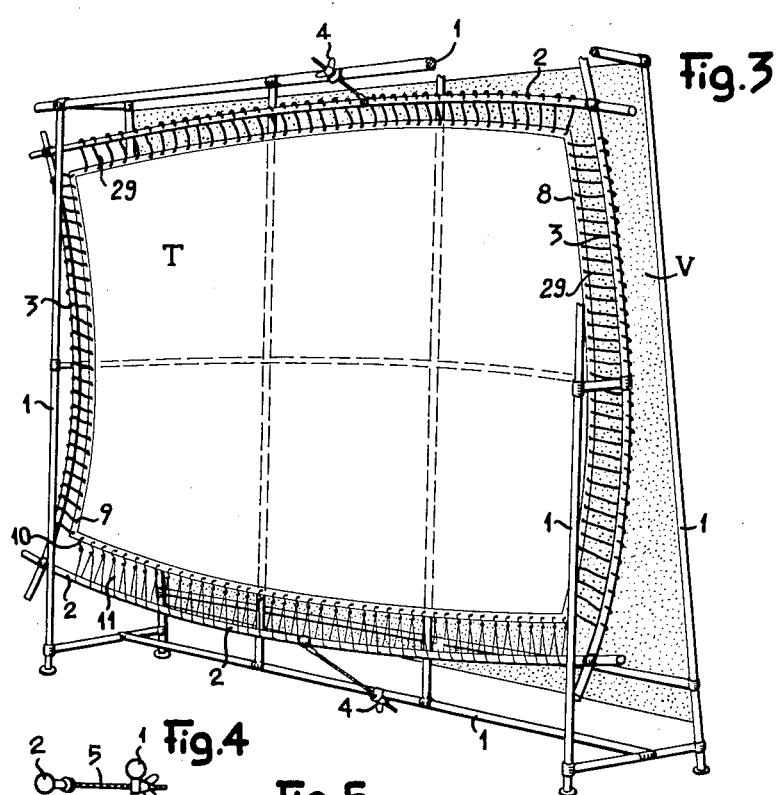
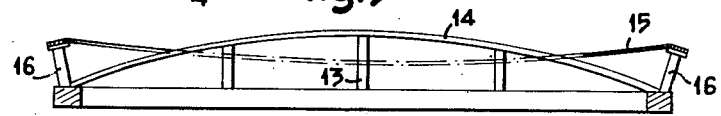
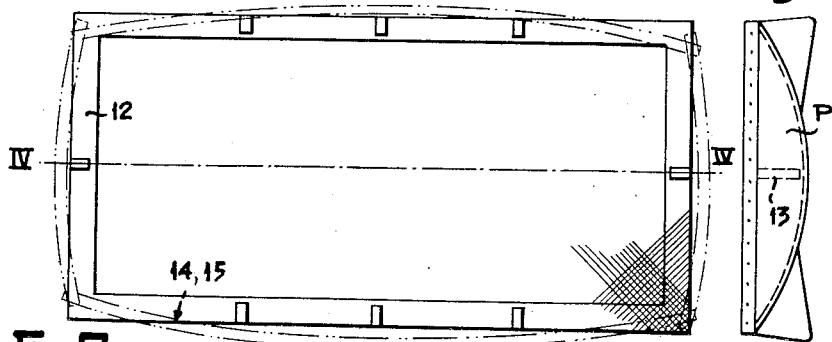
INVENTOR
ALBERT CAPETTA
BY Irwin S. Thompson
ATTY.

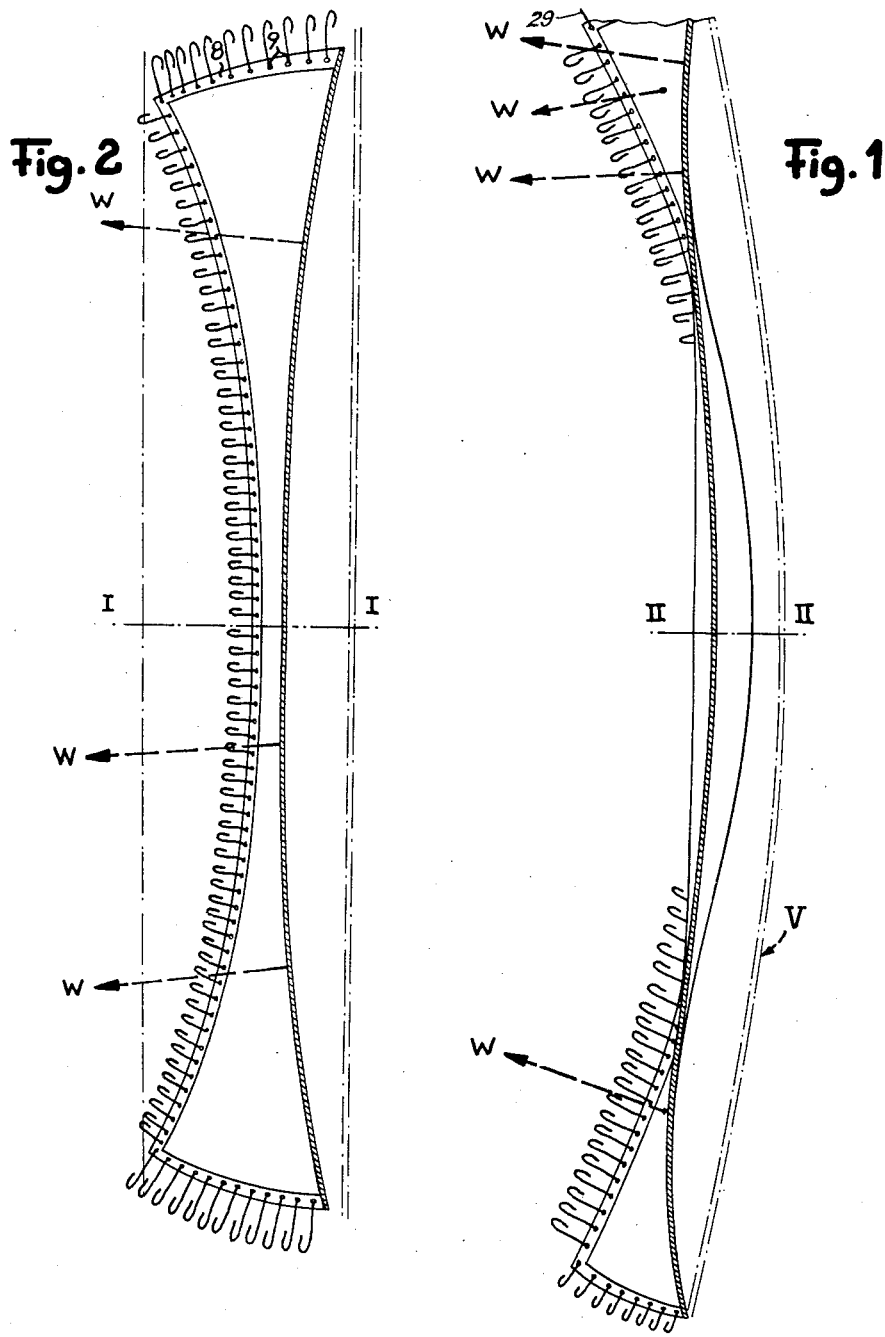

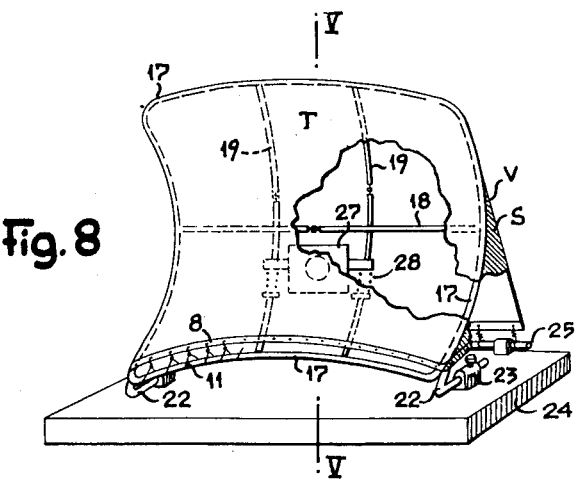
Fig. 8
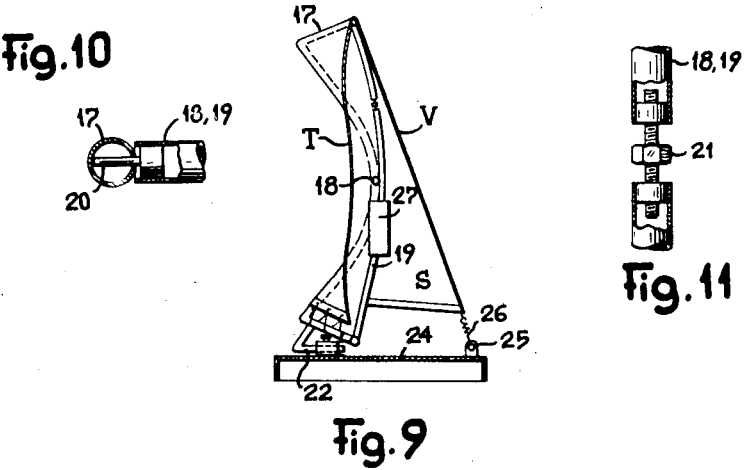
Fig. 10
Fig. 9
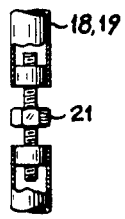
Fig. 11

June 5, 1962     A. CAPETTA     3,037,424
PROCESS FOR THE REALIZATION OF A RELIEF SCREEN
AND SCREEN OBTAINED BY THE PROCESS
Filed Jan. 10, 1958     4 Sheets-Sheet 4

INVENTOR
ALBERT CAPETTA
BY Irwin S. Thompson
ATTY.

United States Patent Office 3,037,424
Patented June 5, 1962

3,037,424
PROCESS FOR THE REALIZATION OF A RELIEF SCREEN AND SCREEN OBTAINED BY THE PROCESS
Albert Capetta, 212 Ave. du General Michel-Bizot, Paris, France
Filed Jan. 10, 1958, Ser. No. 708,247
Claims priority, application France Jan. 15, 1957
5 Claims. (Cl. 88—28.9)

The present invention has as an object an enhanced relief screen for the restitution of a projected image, as in cinematography, for fixed or animated transparency projection, or for artistic paintings or photographic enlargements laid onto said screen, or other similar uses.

The screen of the present invention is made by joining two profiles opposed one to the other, one of which is concave and the other one convex and connected one to the other by curved lines so as to avoid any crease or crack in the image and to give back various reflection angles.

A screen thus made permits better optical restitution of the image, to give a more spontaneous vision without ocular fatigue and to induce a physical relief of planes introducing the third dimension, so as to produce a more plastic and more physical restitution of the represented subject together with a better light distribution with absence of aberrations.

Such a screen is useful for the restitution of cinematographic and photographic images, for the projection of the image of a transparency or for artistic paintings, scenery, advertising screens mounted onto this screen or subjects printed after a flat subject preparation and mounted afterwards onto said curved screen in any pictured representative manner.

A further object of this invention is a screen which comprises a frame, arches carried by said frame, a screen stretched on said frame and arches, said screen being made of a fabric cut on the bias whereby said screen takes automatically a concave-convex shape deforming a view on said screen in order to produce an effect introducing the third dimension.

The attached drawing shows schematically and by way of example three embodiments of the screen which is the object of the present invention.

FIG. 1 is a cross section of the screen along line I—I of FIG. 2, showing the side profile of the screen.

FIG. 2 is a longitudinal section along line II—II of FIG. 1, showing the longitudinal profile of the screen.

FIG. 3 is a perspective view of the first embodiment of the screen.

FIG. 4 is a detail view of FIG. 3.

FIG. 5 is a longitudinal section according to line IV—IV of FIG. 7, of the frame of the second embodiment of the screen.

FIG. 6 is a side view showing the profile of the screen according to FIG. 7.

FIG. 7 is a front view of the second embodiment of the screen.

FIG. 8 is a perspective view of the third embodiment of the screen.

FIG. 9 is a cross section along line V—V of FIG. 8.

FIGS. 10 and 11 are details of the embodiment shown on FIGS. 8 and 9.

Figure 12:
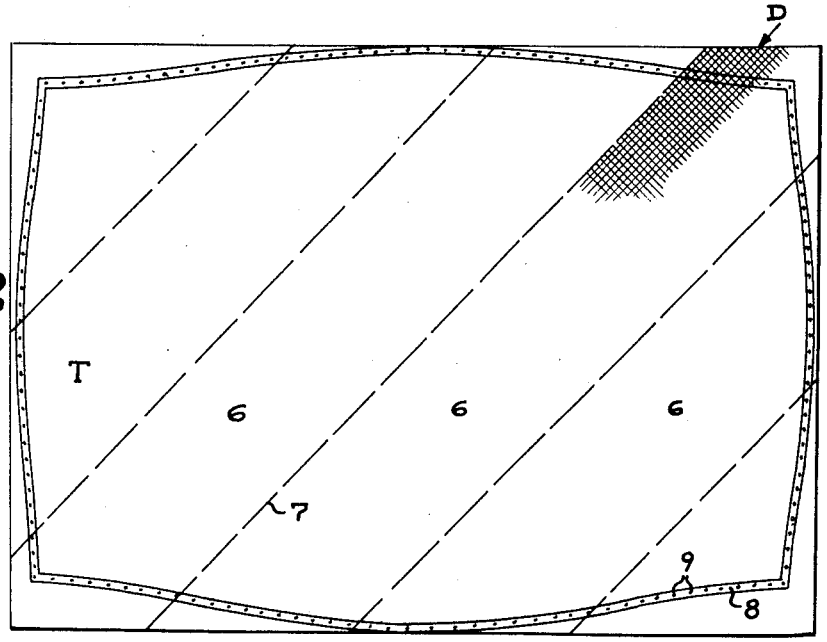
FIG. 12 shows schematically the way in which the screen fabric is to be cut for large screens.

According to FIGS. 1 to 3 of the attached drawings the screen comprises a rigid frame formed of tubes 1 which support upper and lower arches 2 and side arches 3 for holding in a desired shape a fabric T, of white canvas for example. The curvature of the arches may be modified at will, by means of stretching devices 4 provided with micrometric screw 5. The canvas T is cut on the bias as shown on FIG. 12 wherein the arrow D shows the direction of straight yarn.

Said yarn direction allows the frame and arches to shape the screen without crease or crack and to give to said screen the desired longitudinal and transverse profiles without any absence of continuity (FIGS. 1 and 2).

Figure 13:
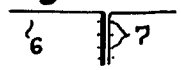
FIG. 13 shows a detail of the seams of the fabric.

In the case of a large screen, the canvas T is formed of several pieces 6 joined at their margins 7 (FIGS. 12 and 13). These pieces 6 are disposed on the bias for the cutting of the canvas T, in order to obtain a profile providing optical correction and enhancing the appearance of relief of the image. The canvas T is cut as shown on FIG. 12, according to the particular weaving of the fabric (in the example shown the fabric has a straight weaving), so that the curvatures of the canvas yield, after stretching the concave-convex profile with its secondary curvatures as shown on FIGS. 1 and 2. The canvas is hemmed with a strong lace 8 provided with eyelets 9 through which pass hooks 10 carried by strings 11 attached to the arches 2 and 3.

In order to improve the contrasts of the image projected onto the screen, an absorbing screen V is provided, said absorbing screen V being preferably of a green-blue tint. Said screen V is stretched directly on the frame 1. As shown on FIGS. 3 and 9, the screen V is placed behind the white projection screen T. Furthermore, said absorbing screen V is constituted by assembled pieces of fabric covering the whole backface of the projection screen T.

Figure 14:
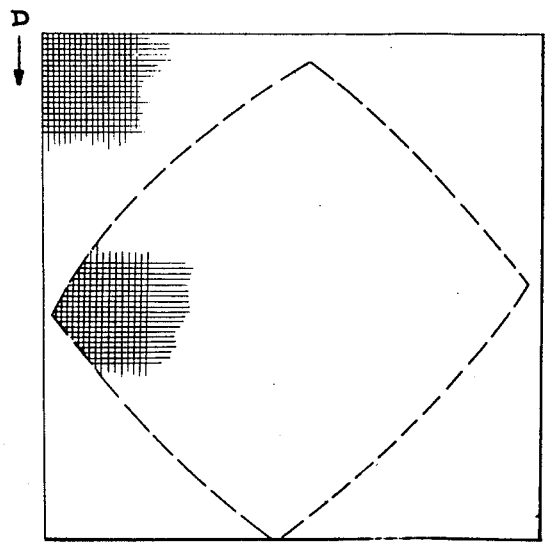
FIG. 14 shows schematically the way in which the fabric is to be cut for small screens.

In the second embodiment shown on FIGS. 5, 6 and 7, the projection screen comprises a support constituted by a rigid frame 12 provided with blocks 13, on which the arches 14, 15 are shaped. The ends of said arches are fixed to the four corners of said frame 12 which are provided each with a support 16. On said frame 12, whose elements are preferably made of wood, is stretched the canvas T, cut according to the dotted line shown on FIG. 14 and fixed by means of small nails. The profile P shown in FIG. 6 is so obtained.

This particular embodiment of screen is especially adapted to receive artistic paintings. When a subject has been painted on the screen, shaped as shown on FIG. 6, it is cut out, laid flat and then reproduced on a piece of fabric cut according to the shape shown on FIG. 14. The reproduction, deformed when flat, takes its correct aspect again after being shaped onto the support and appears in relief.

The above described support according to FIGS. 5, 6 and 7 is also useful for photographic enlargements. In this case, the canvas T is replaced by a silk fabric or muslin onto which is laid, in a dark room, a layer of a photo-sensitive emulsion. Said silk fabric or muslin, stretched on the support, is sheltered from the light. The impression is then made by projecting onto said screen a photographic image by means of a known enlargement process.

To obtain a screen according to the invention suitable for an enlargement viewing apparatus, or for a television apparatus, it is sufficient to mould an opal glass according to the profile or shape desired and to mount this opal glass onto a support or frame such as the frame 12.

In the third embodiment of the screen according to the invention, shown on FIGS. 8 to 11, the screen comprises a frame formed of tubes 17 and shaped according to the horizontal and vertical curvatures shown on FIGS. 8 and 9. A horizontal cross-bar 18 connects the vertical sides of the frame 17 and two cross-bars 19 connect its horizontal sides. The cross-bars 18, 19 are fixed to the tubes 17 by means of a pin 20 (FIG. 10), or the like, in order to avoid any protuberance on the frame surface. The length of the cross-bars 18, 19 is adjustable by means of a left-hand and right-hand threaded screw 21, shown on FIG. 11, so as to possibly adjust the length and width of the frame 17. The frame 17 is supported by two feet 22 engaged in clamping eyes 23 fixed to a base 24.

The reflecting screen T and the absorbing screen V are sewed together with side flaps S so as to form a sort of bag, which is attached, on the one hand, at the lower part of the screen T to the frame 17 by means of the hooks 10 and strings 11 and, on the other hand, at the lower part of the screen V to a horizontal rod 25, fixed to the base 24, by means of tightening devices 26. By stretching the screens T and V onto the frame 17, the screen T, which has been cut in the bias according to the shape to be obtained, is given the horizontal and vertical curvatures corresponding to the desired profile.

In the above described embodiment, as well as in the first embodiment shown on FIG. 3, the mounting of a loud-speaker 27 behind the screen T, can easily be provided as shown on FIGS. 8 and 9. In order to avoid any vibration of the screen T which could be transmitted to the screen by the loud-speaker vibrations, the loud-speaker is yieldingly mounted on the vertical cross-bars 19 by means of springs 28 or the like.

The spontaneous vision, without necessary accommodation of the eyes, is integrally obtained when the viewer is placed at the focal center of the screen curvature. Moreover the integral light restitution, without the aberrations of the usual projections, is also obtained when the source of light is placed at the focal center. It is clear that the integral conjunction of both these properties cannot be obtained in a cinema-hall, but an average curvature in both directions, suited to each hall and to each projection condition, permits the obtaining of the above mentioned advantages. This curvature variation is obtained by means of the stretching devices 5 of the image support which facilitates achieving the desired profile by setting the horizontal and vertical curvatures of the shaping frame 2, 3. The profile shaping of the image support is automatically obtained by the bias of the fabric when said fabric is stretched on the frame.

The image obtained at various reflection angles induces variations in the illumination, which increase the plastic relief effect and give to the projected subject a more physical, real and alive aspect. Furthermore, the angle of vision being widened in all direction, the distortion is suppressed. Under a much wider angle, this property permits a much closer viewing of the screen, without ocular fatigue, and refines the subject viewed.

This presents a very great advantage for projections onto large surfaces, as large cinema screens, and allows a much closer seating to the screen in spite of its large size.

The image presented by the screen, obtained by the screen shaping allows, on the other hand, its utilisation in wide halls, the plastic effect obtained suppressing the lengthening effect on both sides and the correction of the horizon line in case of views having great depth, in spite of the concavity of the screen.

The arrows W (FIGS. 1 and 2) show the radiation in all directions of the restitution.

An adjustment of the screen curvature permits giving to the screen a very accurate and most suitable optical profile. Due to the screen bias malleability, this profile can take the desired shape.

I claim:
1. In an optical apparatus, a frame having four sides and four corners, each of said sides arching outwardly of the area encompassed by said frame, said sides having the form of arc of circles, each of said corners lying in a plane closer to the viewer than the middle points of said sides, the combination of a screen attached to said sides, said screen consisting of a fabric having threads extending diagonally with respect to the sides thereof, strips disposed along the sides of said screen each of said strips having a convex curvature in its transversal direction and a concave curvature in its longitudinal direction, said corners of said screen obtained by the intersection of two of said strips thereby forming convex curvatures in all directions thereof while a central portion of said screen forms convex curvatures in all directions thereof, and an intermediate zone of said screen, located between said strips and said central portion, having concave curvatures in all directions thereof.

2. Optical apparatus according to claim 1 wherein adjustable means are provided for attaching the screen to the frame.

3. Optical apparatus according to claim 1, the sides of said frame comprising tubular members.

4. Optical apparatus according to claim 1, said frame having a pair of feet secured thereto for supporting it.

5. An optical apparatus as claimed in claim 1 and in which each of said sides is curved along an arc of a circle and in which the radii of each of said arcs are equal to each other.

References Cited in the file of this patent
UNITED STATES PATENTS

| | | |
|---|---|---|
| 1,330,447 | Pech | Feb. 10, 1920 |
| 1,650,341 | Goldstein | Nov. 22, 1927 |
| 1,701,590 | Oliver et al. | Feb. 12, 1929 |
| 2,346,257 | Hehn | Apr. 11, 1944 |
| 2,365,010 | Rogers | Dec. 12, 1944 |
| 2,369,143 | Hehn | Feb. 13, 1945 |
| 2,473,301 | Ramstad | June 14, 1949 |
| 2,699,090 | Underhill | Jan. 11, 1955 |
| 2,909,963 | Hehn | Oct. 27, 1959 |
| 2,942,517 | Moon et al. | June 28, 1960 |